United States Patent [19]
Collinson

[11] Patent Number: 5,178,469
[45] Date of Patent: Jan. 12, 1993

[54] BIODEGRADABLE CONTAINER FOR LIQUID-CONTAINING SOLID MATERIALS

[75] Inventor: Jonathan W. Q. Collinson, New Sharon, Me.

[73] Assignee: Woods End Research Laboratory, Inc., Mount Vernon, Me.

[21] Appl. No.: 786,546

[22] Filed: Nov. 1, 1991

[51] Int. Cl.⁵ .................. B65D 30/08; B65D 30/16
[52] U.S. Cl. .................................. 383/1; 383/102; 383/104; 383/121; 428/34.3; 428/535; 428/536
[58] Field of Search ................ 381/1, 113, 104, 121, 381/102; 428/535, 536, 34.3

[56] References Cited

U.S. PATENT DOCUMENTS

| | | | |
|---|---|---|---|
| 242,664 | 6/1881 | Lockwood | 383/121 |
| 2,029,340 | 2/1936 | Royal | 383/116 |
| 2,032,880 | 3/1936 | Kinsley et al. | 383/68 |
| 2,062,618 | 12/1936 | Sterling | 383/88 |
| 2,070,747 | 2/1937 | Orstrom | 383/119 |
| 2,078,467 | 4/1937 | Sterling | 383/113 |
| 3,084,984 | 4/1963 | Adler | 383/116 |
| 4,460,426 | 7/1984 | Saito | 383/104 |
| 4,610,358 | 9/1986 | Walter | 383/1 |
| 4,815,590 | 3/1989 | Peppiatt et al. | 383/119 |
| 4,890,936 | 1/1990 | Cooper | 383/119 |

FOREIGN PATENT DOCUMENTS 406170 1/1991 European Pat. Off. ............. 383/1

Primary Examiner—Stephen P. Garbe
Attorney, Agent, or Firm—Frederick R. Cantor

[57] ABSTRACT

A collapsible biodegradable container, or bag, for containing liquid-containing solid materials, e.g., compostible materials, such as food waste, yard waste, etc., from restaurants, homes, etc. A single sheet of two-ply material is used to form both the bag side walls, as well as the bag bottom wall. Kraft paper is used to form the bag outer surface, whereas a cellulose film, or cellophane, is used to form the bag inner surface. A slab of moisture-absorbent material is also placed on the bag bottom wall, to intercept liquid draining from the contained material toward the bag bottom wall. The outer paper ply gives the bag its structural strength, so that it can be self-sustaining in an upright condition. The inner cellulose layer, or cellophane ply, provides a liquid barrier to protect the outer paper ply from the destructive effects of liquid. The bag, is also permeable to air and water vapor, while retaining liquids.

7 Claims, 2 Drawing Sheets

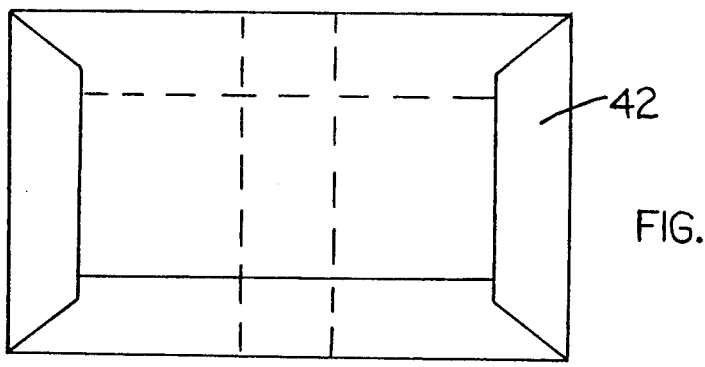
FIG. 7
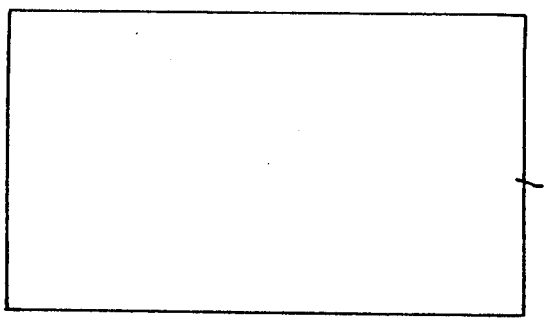
FIG. 8
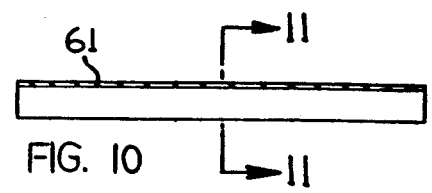
FIG. 11
FIG. 10
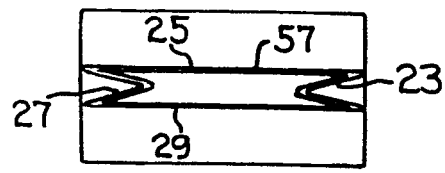
FIG. 9
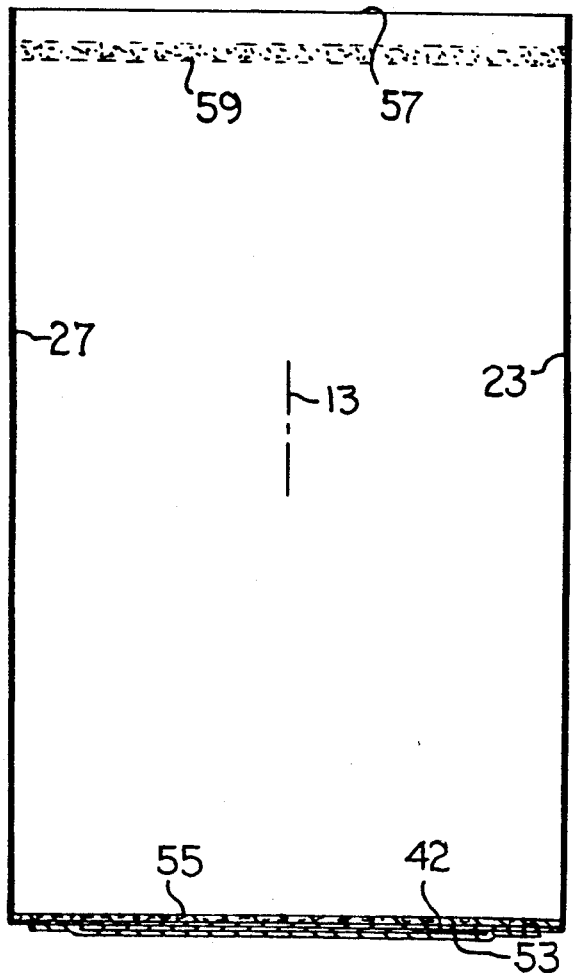
FIG. 6

BIODEGRADABLE CONTAINER FOR LIQUID-CONTAINING SOLID MATERIALS

BACKGROUND OF THE INVENTION

The present invention relates to containers for solid materials having liquids associated therewith, e.g., such materials as liquid-laden fruits, vegetables, household waste, fresh meat or seafoods, and yard waste, such as grass clippings. The above materials are known to provide the basis for desirable composting substrates. Thus, the present invention provides a fully, and rapidly, biodegradable container suitable for composting, and related purposes.

It is useful for our purposes to note that Nature disposes of millions of tons of plant debris each year, with the main constituent of plant tissue being cellulose. The present invention, therefore, has utilized a material made from cellulose, called, herein, cellulose film, or cellophane, which is fully biodegradable, just as leaves and plants are, to become the basis of the herein-described fully biodegradable container, suitable for all composting purposes.

Cellulose, along with sugars and starches, belongs to a group of chemical compounds known as carbohydrates. Carbohydrates contain only carbon, hydrogen, and oxygen, and are the ultimate source of most of the foods that we eat.

The backbone of cellulose is the glucose molecule. In trees, for example, this glucose molecule is accompanied by smaller and larger sugars, as well as lignin, all of which make up the vascular structure we see as wood. The glucose, or glucan, molecules form long chains which are the building blocks of fibers. More specifically, cellulose film, or cellophane, is made from regenerated cellulose, which no longer contains lignins, and long fiber chains.

Micro-organisms, such as fungi and bacteria, typically found in soil, and elsewhere, break down the cellular walls of the glucose molecules and digest them. A material is considered biodegradable if it is capable of being decomposed, or compostible, by natural biological processes. Consequently, this process of micro-organisms breaking down and digesting the cellular walls in cellulose film, or cellophane, allows the cellulose film, or cellophane, material to completely biodegrade.

This same activity occurs with trees and plants. The primary difference is the time it takes to biodegrade. Trees and plants take much longer to biodegrade than cellulose, because the lignins and long molecular fiber chains in these materials are more difficult to biologically break down.

It is known that solid materials having a significant liquid content can be carried in waterproof containers, i.e., bags or sacks, having liquid impervious liners therein. In some cases, the bag or sack can be formed from a two-ply sheet material, comprising an outer layer of paper and a non-biodegradable inner layer of wax, or a liquid-impervious plastic film-material, such as polyethylene, polyvinyl chloride, polyethylene terephthalate, oriented polypropylene, or the like.

One major problem with such bag-like containers is that they are not adequately biodegradable when they are either littered, or later placed in landfills. In an ever-increasingly environmentally conscious world, there is now a strong need for a bag-like container that is both liquid impervious, and at the same time, completely or fully, and rapidly biodegradable.

A further requirement is that the bag-like container should have a mouth construction that is both sealable and unsealable with minimum effort. Thus, odor-producing liquid-containing materials can be placed into the container at spaced time intervals, e.g., once or twice per day, until the container is at least substantially filled. Further, the bag-like container construction should be such that odors are substantially trapped within the container during standby periods, between each placement of material into the container, and the next placement of material into the container.

A further requirement is that the bag-like container should be manufacturable at relatively low cost. Preferably, the materials used to make the bag should be relatively low cost materials, that are also readily available in reasonably large quantities, whereby the bag can be mass-produced at low cost in a range of different sizes.

As a related matter, it is also desirable that the bag-like containers be manufacturable with existing machines and apparatus, i.e., apparatus that is already in use for manufacturing conventional bag-like containers.

Another desirable feature would be a bag-like container that is self-sustaining, or self-standing, i.e., a bag construction that will stand by itself on a floor, or shelf, in an open condition, ready for placement of moist or wet solid materials therein. Also, the bag should have a relatively high wet strength, so that it can hold a reasonably large amount of wet solids without bursting, leaking, or disintegrating.

SUMMARY OF THE INVENTION

An object of the present invention is to provide a bag-like container, formed of a single sheet of two-ply material, comprising an outer paper layer and an inner cellulose film, or cellophane, layer. The two layers are adhesively secured together by discrete discontinuous patches or strips of adhesive, so that the two layers form a single sheet capable of being creased, folded and otherwise reformed into a hollow upright bag. The adhesive is applied as discrete patches, or strips, in order to minimize raw material costs.

The cellulose film, or cellophane, layer forms a liquid-impervious inner layer, for containment of liquids associated with the materials placed into the bag, e.g., fresh meat, waste food products, moist grass clippings, etc. The outer paper layer imparts a certain structural rigidity to the bag, such that, in use, the bag can be positioned upright on the floor, ground or other surface, without toppling over. Further, the bag is preferably formed with a flat bottom wall and four upstanding side walls.

In preferred practice of the present invention, the bag is also reinforced against bursting or disintegrating, with the desired reinforcement being achieved by means of a rectangular patch of material adhesively secured to the outer surface of the bag bottom wall. The bag bottom wall is comprised of sheet sections folded onto each other in contiguous connection with the bag side walls. The reinforcement patch, applied to the bag bottom wall, spans the folded sections to effectively form a high-strength, double thickness, bottom wall for the bag.

In most situations, especially when the bag is of a relatively small size, the cellulose film, or cellophane inner layer, is fully effective to substantially preclude liquid passage therethrough into the outer paper layer.

However, under some circumstances, additional protection against leakage into the outer paper layer may be necessary or desirable. A slab of liquid-absorbing material may be placed against the upper face of the bag bottom wall, in order to absorb liquid downflowing from materials placed into the bag. The slab of material may take a variety of different forms, e.g., one or more thicknesses of conventional blotting paper, a layer of recycled absorbent papers in particulate, or shredded, form, a biodegradable polycyclic aromatic hydrocarbon in sheet form, or a layer of dried sludge formed as a by-product in the paper manufacturing process. The liquid-absorbent slab is preferably formed of a biodegradable material, so as not to detract from the overall fully biodegradable character of the bag of the present invention.

The liquid-absorbent slab is placed directly on the bottom wall of the bag so as to substantially completely cover the bottom wall. Any liquid draining from the liquid-containing material inside the bag, will contact the liquid-absorbing slab, prior to exiting through the bag bottom wall. Excessive quantities of liquid will be captured by the slab, thereby, also reducing the liquid loading on the bag bottom wall.

A very important feature of the present invention is the use of pure cellulose film, or cellophane film layer, as the liquid-resistant inner layer of the bag. The cellulose film, or cellophane, forms the entire inner surface of the bag, thereby shielding the Kraft paper outer layer from direct contact with liquid carried within, or on, materials placed into the bag.

As discussed, cellulose is an organic compound containing only carbon, hydrogen and oxygen, and it is therefore classified as a carbohydrate. Therefore, cellulose is fully and readily biodegradable, but it is nonetheless sufficiently resistant to liquid, to serve as a liquid-containment inner ply of the two-ply bag structure. Over time, cellulose film, or cellophane, in a thin-layer form, will allow very small quantities of water vapor and other gases, to pass therethrough, at a slow controlled rate of approximately 0.5 grams per one hundred square inches surface area, in a twenty-four hour period. The oxygen gaseous transfer rate through cellulose film, or cellophane, is about 0.8 grams per one hundred square inches surface area, per twenty-four hour period.

Cellulose film, or cellophane, is also sometimes used as a semi-permeable membrane in dialysis procedures. The membrane is interposed between two liquids to act as a diffusion membrane, allowing small ions, or molecules, to pass therethrough, while preventing the passage of larger ions, or molecules. The controlled permeability of cellophane film is believed to be advantageous in promoting biodegradability of the film when it is incorporated into a compost bag for containment of liquid, or water-containing, solid materials, such as waste food, grass clippings, or the like.

The semi-permeable cellulose film, or cellophane, is sufficiently resistant to passage of water therethrough, such that a two-ply bag form, having a cellulose film, or cellophane, inner layer and a paper outer layer, will maintain structural integrity for several days after being filled with liquid-containing solid materials.

As previously noted, the primary advantage of a bag formed out of a paper-cellulose laminate, is its complete and rapid biodegradability. It is conceived that the bag can also be constructed in various sizes, ranging preferably up to about two cubic foot capacity, without sacrificing the desired self-sustaining, or upstanding, structural integrity and liquid containment capability.

In a preferred embodiment of the present invention, the bag is comprised of four upstanding side walls defining a rectangular bag cross section. Two of the four side walls have pre-formed vertical creases therein, permitting the walls to be folded inwardly toward the bag central axis, to a condition wherein the upper edges of the bag side walls are brought into sealed engagement with one another. The bag structure is thus capable of being readily sealed shut to trap noxious or annoying odors within the bag. This is particularly desirable when the bag is being used to contain kitchen food wastes, or similar wastes.

The bag can be maintained in a sealed condition by means of pressure-sensitive adhesive coatings, applied, or formed on, the container side walls adjacent to their upper edges, at the mouth of the bag. After the upper edge areas of the bag side walls have been brought together, the conforming adhesive areas may be readily pressed together to form a vapor seal along the mouth area of the bag. The bag can also be rapidly opened, or unsealed, for ready placement of additional materials into the bag, whenever it becomes necessary. Additional sealing and resealing of the bag is a relatively quick procedure.

In summary, and in accordance with the above discussion, the foregoing objectives are achieved in the following embodiments.

(1) A collapsible biodegradable container bag for liquid-containing solid materials, said container bag comprising, a rigid tubular container body, that includes side walls defining a central axis, and a bottom wall; said container body being formed of a single sheet of material that forms both an inner surface and an outer surface of said container body; said sheet of material being of a two-ply construction, further comprised of an outer paper layer and an inner cellulose film layer.

(2) The container bag as described in paragraph 1, wherein said container body has a rectangular cross-section measured transverse to said container central axis; and two of said side walls having creases therein, whereby, said two side walls can be folded inwardly toward said central axis, to reconfigure the container body into a flat condition.

(3) The container bag as described in paragraph 2, wherein said container bottom wall has a rectangular plan outline, and a rectangular liquid-absorbent lining adhesively attached to said inner surface of said container bottom wall.

(4) The container bag as described in paragraph 3, and further comprising a reinforcement patch adhered to the outer surface of the container bottom wall.

(5) The container bag as described in paragraph 1, and further comprising discontinuous spaced adhesive connections between the paper layer and said cellulose film layer; and the combined area of the adhesive connections being substantially less than the total area of said two-ply sheet.

(6) The container bag as described in paragraph 1, wherein said cellulose film layer has a controlled porosity; wherein the water vapor transfer rate through the cellulose layer, is approximately one-half gram per one hundred square inches in a twenty-four hour period.

(7) A foldable biodegradable container bag comprising, a relatively flat bottom wall, and four upstanding side walls contiguous with said bottom wall, said bottom wall and said side walls, being formed of a single sheet of material having an inner surface and an outer surface, said sheet of material being of two-ply construction, comprised of a paper layer and a cellulose film layer, said sheet of material being folded so that said cellulose film layer forms an inner surface of said container bag, and said paper layer forms an outer surface of said container bag.

(8) The biodegradable container bag as described in paragraph 7, wherein said paper layer is relatively thick, and said cellulose film layer is relatively thin, whereby said paper layer enhances rigidification of the container into a self-sustaining condition, and said cellulose film layer forms a substantial barrier against outflow of liquid through said container walls.

(9) The biodegradable container bag as described in paragraph 7, wherein said container has a central axis extending normal to said container bottom wall; and said paper layer and said cellulose film layer being adhered together via spaced strips of adhesive extending parallel to said central axis.

(10) The biodegradable container bag as described in paragraph 9, wherein said spacing between said adhesive strips is substantially greater than the width of each adhesive strip.

(11) The biodegradable container bag as described in paragraph 7, said paper layer having a thickness of from about 0.003 inch to about 0.005 inch, and the cellulose film layer having a thickness of from about 0.001 inch to about 0.002 inch.

(12) The biodegradable container bag as described in paragraph 7, and further comprising a container reinforcement patch adhered to outer surface of said bottom wall; said patch having a plan dimension only slightly smaller than the plan dimension of said bottom wall whereby said patch substantially covers said bottom wall.

(13) The biodegradable container bag as described in paragraph 12, wherein said patch is formed of paper.

(14) The biodegradable container bag as described in paragraph 7, and further comprising a liquid-absorbing wick liner on the inner surface of said container bottom wall.

(15) The biodegradable container bag as described in paragraph 14, wherein said wick liner is substantially coextensive with said container bottom wall.

(16) The biodegradable container bag as described in paragraph 15, wherein said wick liner is in the shape of a flat slab formed out of a liquid-absorbing biodegradable paper material.

(17) The biodegradable container bag as described in paragraph 7, said container side walls having upper edges thereof, located in a common plane to form an open mouth for the container; and two of said side walls having creases therein extending normal to said container bottom wall, whereby said two side walls can be folded inwardly along their respective creases, to bring said side walls into sealed engagement along their said upper edges.

(18) The biodegradable container bag as described in paragraph 17, and further comprising a clip means installable over said upper edges of said side walls, to keep said upper edges in sealed engagement.

(19) The biodegradable container bag as described in paragraph 17, and further comprising a pressure-sensitive adhesive coating on said inner surfaces of said container side walls adjacent to said mouth of the container, whereby when said two side walls are folded inwardly along their respective creases, different areas of said adhesive coating are brought into engagement to form a sealed connection along said container mouth.

(20) The biodegradable container bag as described in paragraph 7, wherein said single sheet of said two-ply material, is folded along four crease lines extending normal to said container bottom wall so that each crease line forms a vertical corner of said container; and said single sheet having overlapped edge areas thereof adhesively secured together to form a seam extending parallel to the vertical corners of said container.

(21) The biodegradable container bag as described in paragraph 20, wherein said paper layer and said cellulose film layer are adhered together via spaced strips of adhesive extending parallel to said container corners.

BRIEF DESCRIPTION OF THE DRAWINGS

In order that the present invention may be more fully and readily understood, and, further, that all the features thereof may be better appreciated, the present invention will now be described by way of preferred examples, with reference to the accompanying drawings.

FIG. 6 is a view of the preferred embodiment taken in the same direction as FIG. 1, but illustrating the bag in a fully assembled condition.

FIG. 7 is a bottom view of the bag, shown in FIG. 6, but with a reinforcement patch removed to show structural details of the bag bottom wall.

FIG. 8 is a plan view of a reinforcement patch used in the bag shown in FIG. 6.

FIG. 9 is a top plan view of the bag shown in FIG. 6, but taken on a reduced scale. The bag is shown in a partially collapsed condition.

FIG. 10 is a view taken through a clip that can be used to hold the embodiment shown in FIG. 6, in a closed condition.

FIG. 11 is a sectional view taken along line 11-11 seen in FIG. 10.

DESCRIPTION OF THE PREFERRED EMBODIMENTS OF THE PRESENT INVENTION

Figure 1:
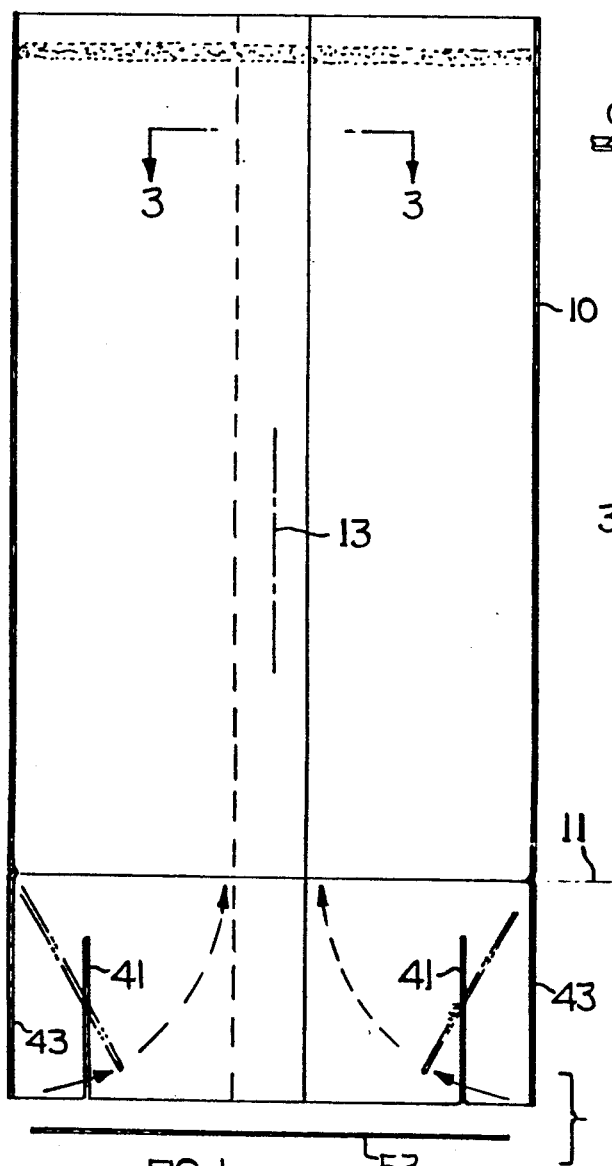
FIG. 1 is a longitudinal sectional view taken through a preferred embodiment bag of the present invention, which is shown in a partially assembled condition.

FIG. 1 is a longitudinal sectional view taken through a preferred embodiment bag of the present invention, which is shown in a partially assembled condition.

Figure 2:
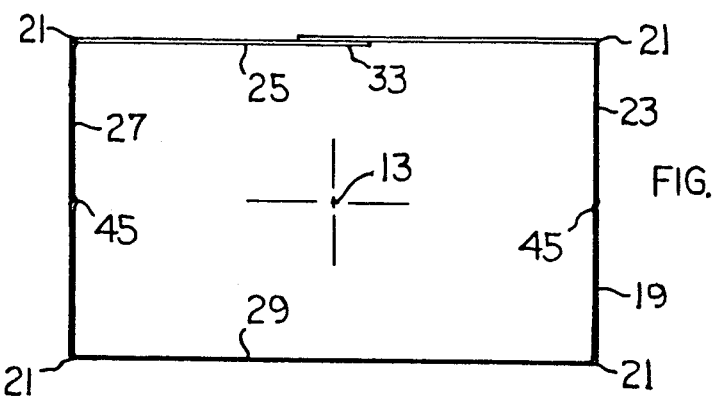
FIG. 2 is a top plan view of the preferred embodiment bag shown in FIG. 1.

FIG. 2 is a top plan view of the preferred embodiment bag shown in FIG. 1.

Referring now to FIGS. 1 and 2, there is shown a tubular wall structure 10, having a hollow rectangular cross section. The wall structure 10, is creased near its lower edge on an imaginary plane 11, whereby the wall sections below plane 11, can be folded inwardly toward the central axis 13 of the hollow wall structure 10, to form the bottom wall of a bag-like container.

Figure 3:
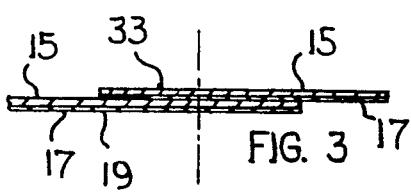
FIG. 3 is an enlarged fragmentary sectional view taken along line 3—3 seen in FIG. 1.

FIG. 3 is an enlarged fragmentary sectional view taken along line 3—3 seen in FIG. 1.

FIG. 6 is a view of the preferred embodiment, taken in the same direction as FIG. 1, but illustrating the bag in a fully assembled condition.

FIG. 6 shows the final configuration of the bag. Wall structure 10, is formed out of a single sheet of material 19, that is comprised of two-plies, or layers, designated by numerals 15 and 17 in FIG. 3. The two-ply layer, or sheet 19, is creased along four parallel lines to form four vertical corners 21, as shown in FIG. 2, that form the junctions between four side walls 23, 25, 27 and 29.

Sheet 19, is comprised of an outer paper ply, or layer, 15, and an inner cellulose film, or cellophane ply, or layer, 17, with the terms "outer" and "inner," referring herein to the respective surfaces of the bag as constructed. Herein, the terms "cellulose film layer" and "cellophane (film) layer" is used, and meant to be, interchangeable. Although cellophane is the preferred cellulose film to be employed, other cellulose films may also be utilized, in appropriate instances. Longitudinal side edge areas 33 of the two-ply sheet 19 are overlapped, as shown in FIG. 3, and are adhesively secured together, in order to form the hollow tubular structure 10. As noted earlier, cellophane layer 17, forms the inner surface of the tubular structure 10, and paper layer 15, forms the outer surface of the tubular structure 10.

The thickness of each layer, i.e., layers 15 or 17, can vary within limits, depending on such factors as the bag rigidity requirement, liquid-barrier requirement, bag size, tear strength requirement, and raw material cost and limitations. Typically, the thickness of cellophane layer 17 will be from about 0.001 to about 0.002 inch; whereas the paper layer 15 thickness will range from about 0.003 inch to about 0.005 inch. However, in certain applications, other thicknesses of the paper and/or cellulose layers, may also be utilized in the practice of the present invention. The cellophane thickness will, in almost any case, be less than the paper thickness. The paper utilized, will preferably be formed from wood pulp derived from pine or other soft wood, in order to promote rapid biodegradability. The cellophane to be used is pure cellulose film, or cellophane, that has an inherent capability for complete and rapid biodegradability, for the reasons previously discussed.

The prime function of the cellophane layer 17, is to act as a liquid, or moisture barrier, i.e., to prevent liquid, or moisture, contained in material deposited into the bag, from leaking or seeping through the inner cellophane layer 17, and into the outer paper layer 15. The prime purpose of the paper layer 15, is to provide structural rigidity to the bag, particularly in an opened state, whereby the bag can be self-sustaining, or self-upstanding, as shown in FIG. 6. The term "self-sustaining," is also used herein, to mean that the bag will remain in an upright condition when placed on the floor, shelf or other support surface, without requiring additional support from a surrounding rigid receptacle, etc.

Figure 4:
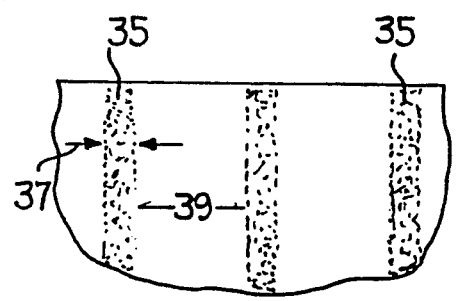
FIG. 4 is a fragmentary view of a wall construction of the preferred embodiment bag shown in FIG. 1, broken away to illustrate an adhesive pattern used to laminate a cellulose film, or cellophane, onto a paper substrate.

FIG. 4 is a fragmentary view of a wall construction of the preferred embodiment bag shown in FIG. 1, broken away to illustrate an adhesive pattern used to laminate a cellulose film, or cellophane, onto a paper substrate.

The paper layer 15, and cellophane layer 17, are adhesively secured together while in the flat, or laminar, state, i.e., prior to being cut to required size, creased and folded. Preferably, the adhesive, which is also liquid or moisture-proof, is applied to one of the layers 15 or 17, as a series of spaced parallel strips, shown as 35 in FIG. 4. Each adhesive strip 35, is oriented parallel to the longitudinal edge of the two-ply sheet 19, i.e., parallel to central axis 13 of the formed bag. By applying the adhesive in strip form, some economies in raw material costs can be realized without sacrificing bag rigidity. Preferably, the transverse width 37 of each adhesive strip 35, is substantially less than the spacing 39 between adjacent adhesive strips 35. With the adhesive strips 35 running longitudinally, i.e., vertically in FIG. 6, the bag stiffness, or rigidity, in the vertical direction is enhanced, thereby helping to achieve the self-standing capacity. In an alternate embodiment, the paper and cellulose layers, may be adhered together, in a heat bonding, or the like, process.

The bag bottom wall, herein is designated by numeral 42 in FIG. 6. The bag bottom wall 42, may be formed by processes and procedures already used to form conventional grocery bags. Slits 41, are formed in the lower edge of tubular wall structure 10. Also, diagonal creases are formed in the wall structure 10, going from the four corners 21, toward the central axis 13. Wall sections 43, are folded inwardly toward axis 13, as shown by the arrows in FIG. 1, after which the flap areas defined by slits 41, are folded onto the folded-in wall sections 43 and onto each other, thereby forming a flat bottom wall 42 extending transverse to central axis 13. Adhesives are used to facially attach the flaps to the folded-in wall sections 43.

For storage and transport compactness, the bag is preferably formed so that it can be folded into an essentially flat configuration. To accomplish this end, each side wall, i.e., 23 and 27, of the bag, has a vertical crease 45 therein, located midway between the associated vertical corners 21, as depicted in FIG. 2.

Figure 5:
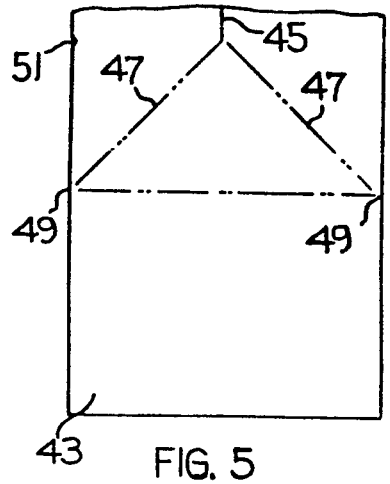
FIG. 5 is a fragmentary right end view of the FIG. bag construction.

FIG. 5 is a fragmentary right end view of the FIG. 1 bag construction.

FIG. 9 is a top plan view of the bag shown in FIG. 6, but taken on a reduced scale. The bag is shown in a partially collapsed condition.

As shown in FIG. 5, two diagonal creases 47, extend from the lower end of crease 45, to a corner 49, formed by the bag bottom wall 42. The side walls, 23 and 27, may be collapsed inwardly in an accordion-like fashion, as shown in FIG. 9. A horizontal crease 51, in side wall 29, seen in FIG. 5, permits the bag bottom wall 42, to be hinged into a flattened position against side wall 29.

It is intended that the bag have a relatively high strength bottom wall 42, because of its intended purpose for containment of liquid or moisture-laden solid materials, such as waste food products in restaurants or homes. Liquid will drain from the contained solid materials onto the bag bottom wall 42. To the extent that minute quantities of liquid, in time, may penetrate the cellulose film layer 17, it can weaken the associated paper layer 15. In order to reinforce the bag bottom wall 42, there is provided a rectangular reinforcement paper patch 53.

FIG. 7 is a bottom view of the bag, shown in FIG. 6, but with a reinforcement patch removed to show structural details of the bag bottom wall.

FIG. 8 is a plan view of a reinforcement patch used in the bag shown in FIG. 6.

FIG. 8, as well as FIG. 1, shows the paper patch 53 dissociated from the bag bottom wall 42. FIG. 6 shows the paper patch 53, adhesively secured to, and contiguous with, the bag bottom wall 42. The plan area of the patch is substantially the same as the plan area of the bag bottom wall 42, such that a substantial reinforcement of the bag bottom wall 42 is provided.

To further ensure the bag structural integrity for reasonable periods of time after placement of moist, or liquid-containing solid materials therein, the bag bottom wall 42, may, if preferred, in an alternate embodiment, be provided with a liquid-absorbing wick liner 55, on its upper face. FIG. 6 shows the absorbent wick liner 55, in place, in cross-section. In plan view, the wick liner 55, will be coextensive with the bag bottom wall, i.e., the wick liner 55 will substantially cover the bag bottom wall 42, so that liquid draining from materials placed in the bag, will have to pass through the wick liner 55, before reaching the bag bottom wall 42, or the paper patch 53.

Absorbent wick liner 55, may be formed of various materials having the ability to trap liquid within the substance of the wick liner 55. For example, the wick liner 55, can be formed out of one or more thicknesses of blotting paper, absorbent paper toweling, or the like paper materials. Recycled absorbent papers in shredded and laminar form may also be used. Other potential wick liner 55 materials are, e.g., biodegradable polycyclic aromatic hydrocarbons, as well as dried sludge, formed as a by-product in the paper manufacturing process. The absorbent wick liner 55, should be formed of a fully and readily biodegradable material, as the other materials utilized in the bag, so as not to interfere with the overall objective of the present invention, which is to provide a bag-type container for liquid-containing solid materials, wherein the container is completely and readily biodegradable.

In many cases the bag will be used to contain materials that might generate offensive odors. The bag should, therefore, be capable of being sealed against escape of any odors, or gases, that might otherwise escape through the open mouth of the bag. The bag is further designed so that opposed side walls 25 and 29 can be brought together along their upper edges, as indicated generally in FIG. 9. By bringing the upper edges 57, of the bag walls 25 and 29 together, it is possible to substantially close the mouth of the bag, thereby preventing the escape of offensive gases or vapors from the bag, into the surrounding environment.

To enhance, or maintain, the sealing action along the bag mouth, the inner surfaces of the four bag side walls, i.e., 23, 25, 27 and 29, may also have a coating of pressure-sensitive adhesive extending therealong, proximate to the bag upper edges 57. As shown in FIGS. 1 and 6, the pressure-sensitive adhesive takes the form of a horizontal strip of adhesive coating 59, spaced a slight distance below the upper edge 57, of the associated bag side wall. Adhesive coating 59, preferably extends along the inner surface of all four side walls of the bag, so as to form a continuous annular adhesive ring on the bag inner surface. When upper edge areas of side walls 25 and 29 are moved in proximity, in the manner depicted in FIG. 9, the opposed pressure-sensitive adhesive areas merge together to form an effective liquid and gas vapor seal.

Additionally, adhesive strips 59, are spaced a slight distance below the upper edges 57, of the bag side walls, so that the user can insert his or her fingers between the non-adhered portions of the side wall 25 and 29 surfaces, to pull opposed side walls 25 and 29 apart for opening the bag, e.g., when it is desired to add additional material into the bag. After the addition of material into the bag, the upper edges 57 of the bag side walls 25 and 29 can be again drawn together to oppose the adhesive areas 59, and, thereby, reseal the bag mouth.

FIG. 10 is a view taken through a clip that can be used to hold the embodiment shown in FIG. 6, in a closed condition.

FIG. 11 is a sectional view taken along line 11—11 seen in FIG. 10.

When the bag is substantially filled, or after the elapse of a suitable time interval, e.g., a week or ten days, the filled bag will be removed from the site for transfer to a landfill. To ensure against inadvertent opening of the bag while it is being transported, a secondary sealing clip 61, may be clamped around the closed upper edges 57 of the bag. The clip 61 shown in FIGS. 1 and 11, is a U-shaped resilient structure, preferably also formed of a biodegradable material. The clip 61 structure can have a length that is a substantial percentage of the transverse width of the bag side walls 25 or 29, whereby the clip 61 exerts a clamping action along a substantial portion of the seal interface.

The illustrated clip 61, is representative of various clip constructions that can be employed to hold the bag in a closed and sealed condition. The clip 61 structures, can be used either as a supplement to the adhesive strips 59, or, in an alternate embodiment, as an alternative to the adhesive strips 59.

As previously discussed, the present invention contemplates a bag-like container formed substantially entirely from completely and readily, or rapidly, biodegradable materials. The bag is comprised of a single sheet of material having a two-ply, or two layer, construction, comprising an inner layer, or ply, of cellulose film, or cellophane, and an outer ply, or layer, of paper. The cellophane layer 17, forms a barrier to the passage of liquids from liquid or liquid-laden materials placed in the bag, whereby the outer paper layer is thereby, protected against the weakening effects of the liquids. A reinforcement paper patch 53, is in facial, or contiguous contact with the bag bottom wall 42, to further strengthen the bag bottom wall 42, against the weakening effects of liquids. Additionally, a slab of liquid-absorbent wick material 55, may, if preferred, in an alternate embodiment, be located on the upper face of the bag bottom wall 42 to intercept liquid draining from the liquid-containing materials toward the bag bottom wall 42.

Additionally, the bag can be constructed, so as to have varying sizes and volumetric capacities. It is now possible to achieve a relatively inexpensive compost bag capable of containing up to about ten pounds of liquid-containing materials. Further, the bag can be formed by utilizing conventional bag-folding apparatus. In the preferred practice of the present invention the bag is designed so that upper edge areas 57 of the bag side walls, can be brought into facial proximity, to seal against the escape of offensive, or undesirable, vapors or gases, that might otherwise emanate from the mouth of the bag. Some means for releasably holding the bag upper edges sealed together may be preferably incorporated into the invention. The drawings herein, show the sealing means as a pressure-sensitive adhesive means 59, and/or, a clip means 61. However, other means such as a releasable tape, or the like, may also be used.

The drawings necessarily show specific forms of the present invention. However, it will be appreciated that the present invention can be practiced in other ways not explicitly depicted in the drawings. The previous detailed description of the preferred embodiments of the present invention is presented for purposes of clarity of understanding only, and mo unnecessary limitations should be understood or implied therefrom, as all appropriate mechanical and functional equivalents to the above, which may be obvious to those skilled in the arts pertaining thereto, are considered to be encompassed within the claims of the present invention.

What is claimed is:

1. A collapsible biodegradable container bag for liquid-containing waste solid materials, said container bag comprising: a flexible, but rigid, tubular container body, that includes side walls, defining a central bag axis, and a bottom wall, spanning the side walls; said container body being formed of a single sheet of material that, forms both an inner surface, and an outer surface, of the container body; said sheet of material being of two-ply construction, comprised of an outer paper layer, and an inner cellulose film layer; and said cellulose film layer having a controlled porosity, wherein the water vapor transfer rate through the cellulose film layer is approximately one-half gram per one-hundred square inches, in a twenty-four hour period.

2. The biodegradable container bag, as described in claim 1, and further comprising, a liquid absorbing wick liner, located on the inner surface of said bottom wall; and wick liner being substantially coextensive with said bottom wall; said wick liner being formed out of a liquid-absorbing biodegradable material.

3. The biodegradable container bag, as described in claim 2, and further comprising, a container reinforcement patch adhered to the outer surface of said bottom wall; said patch having a plan dimension only slightly smaller than the plan dimension of said bottom wall, whereby said patch substantially covers said bottom wall, 4. A foldable biodegradable container bag for liquid-containing waste solid materials, said container bag comprising; a rigid tubular container body that includes side walls, defining a central bag axis, and a bottom wall, spanning the side walls; said container body being formed of a single sheet of material that forms both an inner surface, and an outer surface of the container body; said single sheet of material being of two-ply construction, comprised of an outer paper layer and an inner cellulose film layer; and a liquid-absorbing wick liner located on the inner surface of said bottom wall; said wick liner being substantially coextensive with said bottom wall; said wick liner being formed out of a liquid absorbing biodegradable material.

5. The biodegradable container bag, as described in claim 4, and further comprising a container reinforcement patch, adhered to the outer surface of said bottom wall; said patch being formed of paper and having a plan dimension only slightly smaller than the plan dimension of said bottom wall, whereby said patch substantially covers said bottom wall.

6. The biodegradable container bag, as described in claim 4, wherein said cellulose film layer is sufficiently thin as to have a controlled porosity for the slow passage of water vapor and gases therethrough, for enhanced biodegradability of the bag and it contents in a composting environment.

7. A foldable biodegradable container bag for liquid-containing waste solid materials, said container bag comprising; a flexible, but rigid, tubular container body that includes side walls, defining a central bag axis, and a bottom wall, spanning the side walls; said container body being formed of a single sheet of material that forms both an inner surface, and an outer surface of the container body; said single sheet of material being of two-ply construction, comprised of an outer paper layer and an inner cellulose film layer; said cellulose film layer being sufficiently thin as to have a controlled porosity for the slow passage of water vapor and gases therethrough, for enhanced biodegradability of the bag and its contents, in a composting environment.

* * * * *